US007570889B2

(12) United States Patent
Shastri et al.

(10) Patent No.: US 7,570,889 B2
(45) Date of Patent: Aug. 4, 2009

(54) COMMON ELECTRONIC DISPERSION COMPENSATION ARRANGEMENT FOR USE WITH MULTIPLE OPTICAL COMMUNICATION CHANNELS

(75) Inventors: Kalpendu Shastri, Orefield, PA (US); Bipin Dama, Bridgewater, NJ (US); David Piede, Allentown, PA (US)

(73) Assignee: Lightwire, Inc., Allentown, PA (US)

( * ) Notice: Subject to any disclaimer, the term of this patent is extended or adjusted under 35 U.S.C. 154(b) by 646 days.

(21) Appl. No.: 11/413,675

(22) Filed: Apr. 27, 2006

(65) Prior Publication Data

US 2006/0245761 A1 Nov. 2, 2006

Related U.S. Application Data

(60) Provisional application No. 60/675,785, filed on Apr. 28, 2005.

(51) Int. Cl.
*H04B 10/06* (2006.01)
(52) U.S. Cl. ........................................ 398/209; 398/159
(58) Field of Classification Search ................ 398/147, 398/149, 159, 208, 209, 210, 211
See application file for complete search history.

(56) References Cited

U.S. PATENT DOCUMENTS

| 6,016,379 | A | 1/2000 | Bulow |
|---|---|---|---|
| 6,498,886 | B1 | 12/2002 | Sobiski et al. |
| 6,522,439 | B2 | 2/2003 | Price et al. |
| 6,590,933 | B1 | 7/2003 | Shusterman et al. |
| 6,614,296 | B2 | 9/2003 | Casper |
| 6,694,273 | B2 | 2/2004 | Kurooka et al. |
| 6,856,725 | B2 | 2/2005 | Sillard et al. |
| 6,961,373 | B2 | 11/2005 | Jones |
| 7,058,311 | B1 | 6/2006 | Islam et al. |
| 2001/0040922 | A1 | 11/2001 | Buchali et al. |
| 2001/0043649 | A1 | 11/2001 | Farjad-Rad |
| 2003/0011847 | A1 | 1/2003 | Dai et al. |
| 2004/0258145 | A1 | 12/2004 | Popescu et al. |
| 2004/0258181 | A1 | 12/2004 | Popescu et al. |
| 2004/0258183 | A1 | 12/2004 | Popescu et al. |
| 2005/0031355 | A1 | 2/2005 | Shi et al. |
| 2005/0226631 | A1 | 10/2005 | Thomson et al. |
| 2007/0065162 | A1 | 3/2007 | Kikuchi |

FOREIGN PATENT DOCUMENTS

WO    WO 2004107610 A1    * 12/2004

OTHER PUBLICATIONS

Aramideh, Saeid; "Advanced Signal Processing Engines for Next Generation Optical Transport Systems" Fiber Optic Technology.
Wong, Jim; Kahn, Joseph M. "Performance of Electrical Equalizers in Optically Amplified OOK and DPSK Systems" IEEE Photonics Technology Letters vol. 16, No. 5, May 2004.
Furlong, Michael; Ghiasi, Ali, "Electronic Dispersion Compensation brings native IO Gbps to Networks" Broadcom Corp; Mar. 30, 2006.
Kantner, G.S.; Samal, A.K.; Gandhi, A.; "Electronic Dispersion Compensation for Extended Reach" 2003 Optical Society of America.

* cited by examiner

*Primary Examiner*—Christina Y Leung
(74) *Attorney, Agent, or Firm*—Wendy W. Koba

(57) ABSTRACT

An electronic dispersion compensation (EDC) arrangement for a multi-channel optical receive utilizes a time division technique to "share" a common adaptive algorithm block between a plurality of N separate channels. The algorithm block embodies a specific algorithm associated with correcting/updating tap weights for the delay lines forming the equalizing elements, and a time slot assignment element is used in conjunction with the algorithm block to control the access of the various channels to the algorithm block. In situations where certain channels experience a greater degree of dispersion than others, the time slot assignment element may be configured to allot a greater number of time slots to the affected channels.

8 Claims, 2 Drawing Sheets

COMMON ELECTRONIC DISPERSION COMPENSATION ARRANGEMENT FOR USE WITH MULTIPLE OPTICAL COMMUNICATION CHANNELS

CROSS-REFERENCE TO RELATED APPLICATION

This application claims the benefit of U.S. Provisional Application No. 60/675,785, filed Apr. 28, 2005.

TECHNICAL FIELD

The present invention relates to an electronic dispersion compensation (EDC) arrangement for optical communication systems and, more particularly, to a common EDC arrangement to be shared between, and used by, a multiple number of independent optical communication channels.

BACKGROUND OF THE INVENTION

Today's optical communication systems include, among others, high data rate systems (i.e., speeds at 10 Gb/s and above), long-haul systems, and metropolitan SONET systems. In most current applications, these systems utilize single mode fiber (SMF) as the transmission medium, which limits the link length to at most 80 km, primarily as a result of impairments in the fibers themselves. Moreover, there exist many "legacy" systems that include multimode fiber (MMF) as their backbone communication link. Again, these systems are limited in their link length to no more than 26 m as a result of dispersion problems along the fiber, particularly noticeable at the higher data rates.

More particularly, "impairment" in optical transmission is known to result from various types of optical pulse dispersion along the transmission fiber, where the three main types of dispersion are chromatic dispersion, modal dispersion and polarization mode dispersion. Chromatic dispersion, the result of changes in the physical properties of the fiber itself, is defined as the spreading (in wavelength) of a pulse of light as it propagates over great distances. The longer the fiber over which the pulse travels, the wider the pulse will spread. Difficulties arise when the resulting energy from a pulse begins to interfere with the energy in an adjacent pulse. This interference causes intersymbol interference (ISI) in the electrical domain. The spreading of symbols across each other causes errors; the receive side of the link cannot easily distinguish a "1" from a "0", since they are no longer at the ideal logic levels. Depending on the fiber, pulse spreading may cross over several unit intervals (UIs), with a dispersion of "one UI" defined as immediately adjacent symbols are interfering with each other.

Interference between "modes" of light arriving at a receiver at different times causes modal dispersion in multimode fibers. In particular, for data rates of 10 Gb/s, the ISI resulting from modal dispersion is approximately 5 UI for 220 meters of multimode fiber.

Polarization mode dispersion (typically a concern of SMF applications) is a phenomenon in which a single pulse appears as multiple pulses farther down the fiber. A "perfect" optical fiber would allow for two, orthogonally polarized modes to travel indefinitely along an expanse of fiber. However, various factors (including fiber bends, stress and the like) result in one polarization mode propagating at a different speed than the other, causing a phase difference in their arrival at a receiver.

A variety of techniques have been offered in the past to address these dispersion problems as outlined above. For many years, a common approach was to implement dispersion-shifted fiber, where the fiber was manufactured to exhibit minimal dispersion problems at the common wavelength(s) used for optical communication systems. Another approach was to use dispersion-compensated fiber—again, an arrangement where the fiber was particularly configured to "pre-distort" a propagating optical signal through manipulation of the characteristics of the fiber itself. While these techniques are useful in many situations, the ability to distribute new types of fiber cables in "legacy" systems is not always an option.

There have also been various optically-based arrangements for "measuring" an amount of dispersion present in a received optical signal, and then providing a type of corrective optical signal to essentially compensate for the dispersion. U.S. Pat. No. 6,498,886 issued to D. J. Sobiski et al. on Dec. 24, 2002, discloses an optical dispersion compensation arrangement that is configured as a feedback control module within an optical receiver. The dispersion (both chromatic and polarization mode) are measured in the signal and a "correction" signal is applied if the measured dispersion is above a predetermined threshold. The system of Sobiski et al. is considered to be "adaptive" since measurements are continually made on the arriving optical signal and adjustments are made in real time.

While the Sobiski et al. arrangement—and other conventional optical dispersion compensators—are useful in providing a degree of dispersion compensation, problems begin to manifest themselves when the data rate of the system approaches 10 Gb/s and beyond. That is, a purely optical compensation arrangement cannot "cope" with extreme data rates and the compensation begins to lag the signal speed.

A relatively new type of dispersion compensation that addresses this speed issue is defined as "electronic dispersion compensation" (EDC); in an EDC arrangement, an incoming optical signal is first transformed into an electrical signal. The compensation is then applied to the electrical signal and the "compensated" signal is then re-converted (if necessary) into an optical signal. Since the various types of CMOS-based circuits used to provide the necessary compensation can easily handle data rates in the 10-100 Gb/s range, an EDC arrangement can easily cope with optical communication system speeds.

To date, EDC has been implemented using a variety of equalization algorithms. The three most common algorithms may be classified as: "continuous time filters" (CTF), "feed-forward-equalizer/decision-feedback-equalizers" (FFE/DFE), and "maximum-likelihood-estimator equalizers" (MLSE). CTFs offer the simplest, most cost-effective and lowest power consumption compensation alternative, but are known to also remove a portion of high frequency signal components. FFE/DFE algorithms apply a more sophisticated approach to compensation, using a multi-tap algorithm to compensate for ISI that exceeds one UI of interference. A common implementation of an FFE/DFE arrangement generally comprises an automatic gain control block, a CTF/FFE block, a DFE block, a clock/data recovery (CDR) block, and a least-mean-squared (LMS) adaptation block.

As mentioned above, adaptability is an essential characteristic for EDC arrangements. As optical fibers degrade over time and/or introduce new sources of interference, the EDC arrangement must be able to recognize the changes and adapt the applied compensation. These new sources of interference include, but are not limited to, fiber kinks, fiber bend radius change associated with mechanical vibration (for example, with air flow from cooling fans), ambient temperature changes and the like. All of these factors need to be recognized and the EDC must be adapted to refine the algorithm used to control the applied compensation. Self-adaptation requires closed-loop-feedback mechanisms that enable equipment to calibrate itself by slightly modifying filters and gains that improve signal response until the system achieves an ideal signal.

In many new and expanding applications, a multiple number of fibers are used to establish communication along an optical link from one point to another. Examples of such applications are multi-wavelength WDM systems, or "parallel optical devices" (PODs). Typically, these links employ 2, 4 or 12 fibers (also referred to as "channels"). Typically, each channel carries data that is uncorrelated with the data carried along the other channel(s). As a result, each channel requires its own EDC, independently correcting for fiber-specific dispersion problems, increasing the cost and complexity of a multi-channel optical receiver.

SUMMARY OF THE INVENTION

The need remaining in the prior art is addressed by the present invention, which relates to an electronic dispersion compensation (EDC) arrangement for optical communication systems and, more particularly, to a common EDC arrangement to be shared between, and used by, a multiple number of independent optical communication channels.

In accordance with the present invention, a single adaptive algorithm module is shared between a plurality of N separate, independent communication channels, where the module is coupled in a time-division arrangement to each of separate channels. That is, a clocking element is used to control the accessibility of each channel to the algorithm module, where an adaptation to the dispersion characteristics of each channel are analyzed (and possibility updated) during its assigned time slot. For channels that are known to experience more variable dispersion, a multiple number of time slots may be assigned to that channel and used to provide the desired dispersion correction (i.e., a "weighted" adaptation).

The time-division adaptation arrangement of the present invention may be used with EDCs employing only FFE components, or both FFE and DFE components.

Other and further features and advantages of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
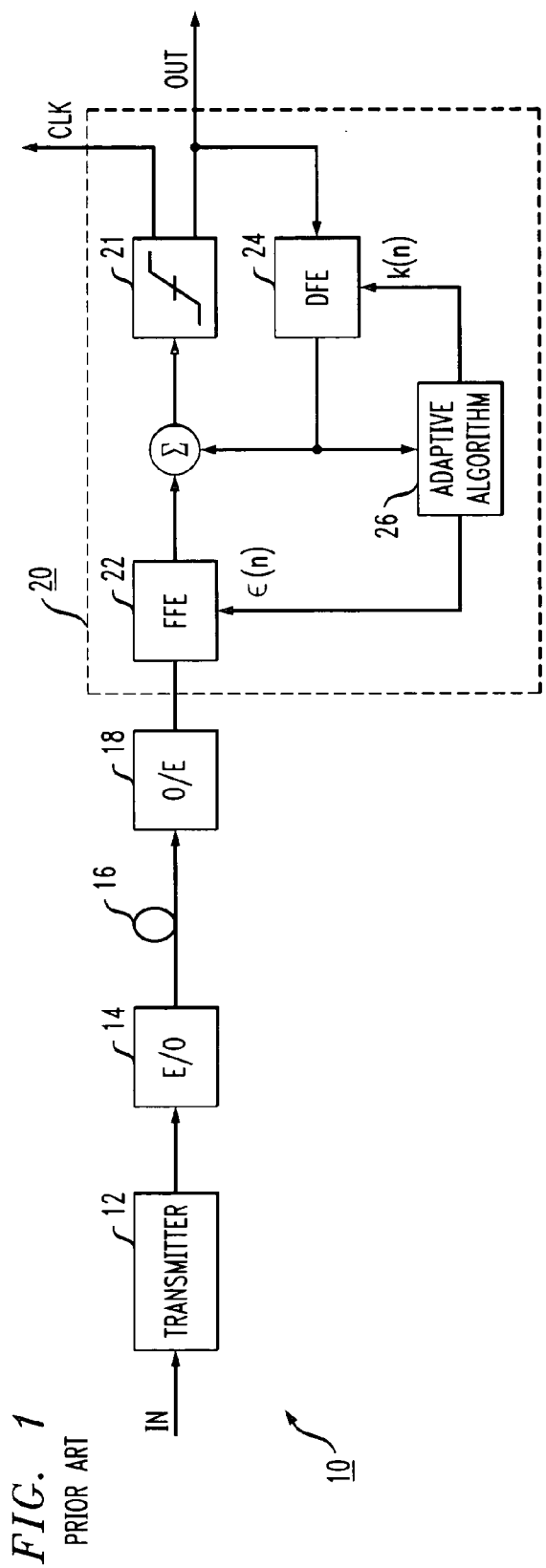
FIG. 1 illustrates a prior art, single channel optical receiver utilizing electronic dispersion compensation (EDC)

FIG. 1 illustrates, for the sake of comparison, a prior art optical communication system 10 employing electronic dispersion compensation. Optical communication system 10 includes a conventional electronic data transmitter 12 coupled to an electro-optic converter 14 for providing an optical data signal to be transmitted over an associated optical fiber link 16. After propagating along optical fiber link 16, the signal is received by an opto-electronic converter 18 and is transformed into an analog, electronic "received" signal. The electrical signal is thereafter applied as an input to an electronic dispersion compensation (EDC) receiver 20, where receiver 20 is used to transform the analog electric signal into a digital version, and provide as separate outputs a digital data signal D and a recovered clock signal Clk. As shown, EDC receiver 20 include a decision threshold circuit 21 which functions to generate a digital output data signal, using a predetermined threshold value to distinguish between the different logic levels.

As mentioned above, the presence of dispersion along the optical fiber signal path between the transmitter and receiver results in some errors in the recovered signal, defined as "intersymbol" interference (ISI). Therefore, EDC receiver 20 further comprises a dispersion compensation arrangement in the form of a feedforward equalizer (FFE) component 22 and a decision-feedback equalizer (DFE) component 24. Other arrangements may utilize only FFE component 22, or only DFE component 24. The characteristics of components 22 and 24 (and thus the dispersion compensation achieved by receiver 20) are controlled by tap weight values assigned to components 22 and 24 by an adaptive algorithm unit 26. In one embodiment adaptive algorithm unit 26 may comprise a "least-mean-squared" (LMS) module that utilizes a current value of an error signal to refine (in an iterative manner) an updated set of tap weights to bring the error signal closer to zero. Other algorithms that may be used in block 40 in place of an LMS algorithm include, but are not limited to, sign-data LMS, sign-error LMS, sign-sign LMS, steepest-descent based algorithms, LMS/Newton algorithms, sequential regression algorithms, adaptive recursive algorithms, random search algorithms, and the like. As shown in FIG. 1, an error signal output from DFE component 24 is provided as the input to adaptive algorithm unit 26 to form the updated coefficient values.

While this prior art arrangement is useful in removing a substantial amount of dispersion in a received optical signal, in systems comprising a multiple number of incoming optical channels, a separate dispersion compensation arrangement is required for each channel, resulting in a rather complicated and cumbersome arrangement that mandates the replication of the adaptive algorithm unit for each separate channel.

Figure 2:
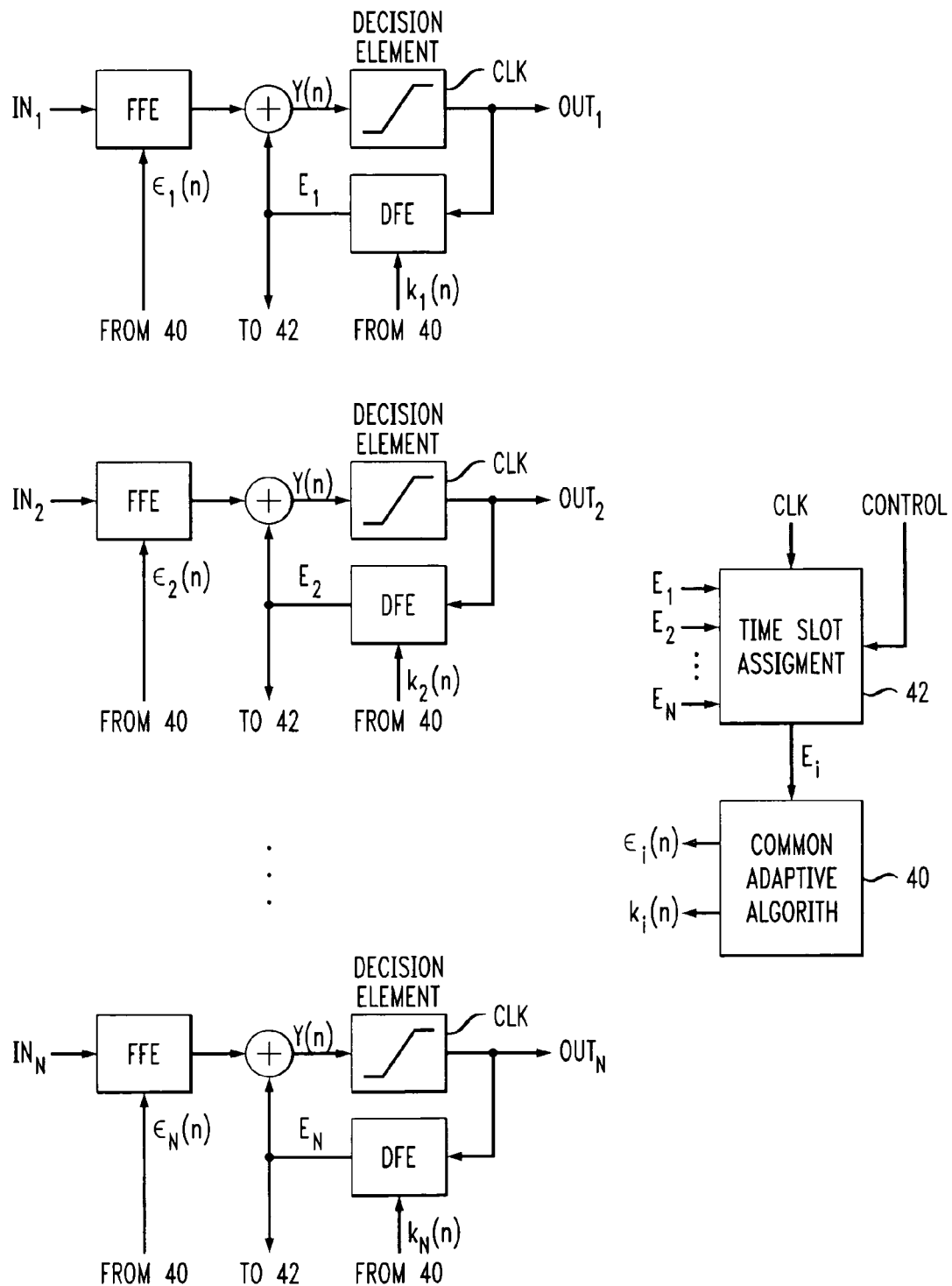
FIG. 2 illustrates an exemplary embodiment of the present invention, utilizing a single adaptive algorithm block in a time-sharing arrangement between a plurality of N optical receive channels.

In accordance with the present invention, therefore, an arrangement is proposed for sharing the adaptation process used for updating tap weight values among a plurality of separate data channels. FIG. 2 illustrates an exemplary embodiment of the invention, where a plurality of separate receiver elements $30_1$, $30_2$, ..., $30_N$ are used to recover a plurality of N separate data signals, denoted $IN_1$, $IN_2$, ..., $IN_N$. Similar to the prior art arrangement as shown in FIG. 1, each receiver $30_i$ includes an FFE element $22_i$ and a DFE element $24_i$. However, in contrast the prior art, the plurality of N separate receivers $30_1$-$30_N$ share a common adaptive algorithm block 40 for providing updated tap weights to FFEs $22_1$-$22_N$ and DFEs $24_1$-$24_N$, eliminating the need for utilizing a separate algorithm block for each channel.

In particular, the ability to share common adaptive algorithm block 40 among the plurality of N receivers $30_1$-$30_N$ is provided by a time slot assignment component 42. Referring to FIG. 2, time slot assignment component 42 receives as an input a recovered clock signal Clk. Time slot assignment component 42 uses this clock signal as a "gatekeeper" to control the particular channel permitted to access common adaptive algorithm block 40 and generate updated tap weight values. For example, time slot assignment component 42 may be configured to divide a given time frame F into a plurality of N separate time slots, as shown in FIG. 3, where each channel i is permitted access to common adaptive algorithm block 40 in accordance with the assignment.

Figure 4:
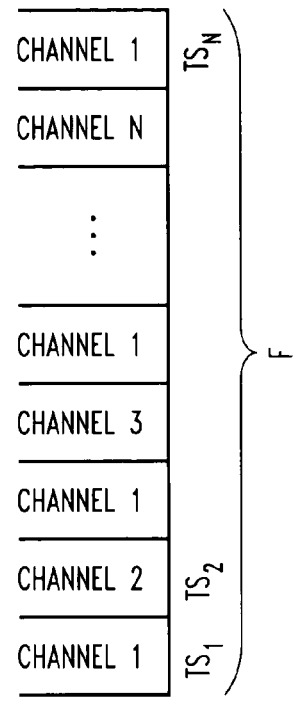
FIG. 4 is a diagram of an alternative time slot assignment, where a single channel is offered a multiple number of time slots for updating the tap weight values of its equalizing components.

It is an aspect of the present invention that the channel assignment itself may be configured so that channels known to exhibit a greater amount of dispersion may be permitted more frequent access to common adaptive channel algorithm 40. FIG. 4 illustrates one exemplary time slot assignment, to be used (for example) in the event that channel "1" is experiencing an extreme amount of dispersion. Thus, channel "1" is given access to common adaptive algorithm block 40 during every other time slot. The assignment may be fixed within time slot assignment component 42, or adaptable as controlled by an "adjust" input signal applied to time slot assignment component 42. Therefore, as dispersion conditions change on the various channels, the number of time slots assigned to each channel may be changed accordingly.

Figure 3:
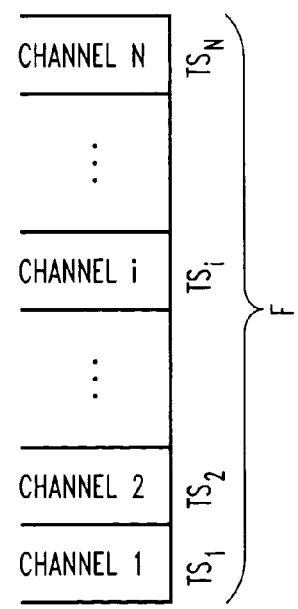
FIG. 3 is a diagram of an exemplary time slot assignment for use in the arrangement of FIG. 2.

In application, therefore, and with reference to FIGS. 2 and 3, during a first time slot $TS_1$, error signal $E_1$ output from DFE component $24_1$ is applied as an input to common adaptive algorithm bock 40. Block 40 uses error signal $E_1$ to generate an updated set of tap weights $\epsilon_1(n)$ to be applied to FFE component 22, and tap weights $\kappa_1(n)$ to be applied to DFE component $24_1$, using the specific algorithm (such as LMS) embodied within block 40. During subsequent time slot $TS_2$ (as controlled by clock signal "Clk"), error signal $E_2$ from DFE component $24_2$ is provided as the input to common adaptive algorithm block 40, generating as separate outputs updated tap weights $\epsilon_2(n)$ and $\kappa_2(n)$, to be applied to FFE component $22_2$ and DFE component $24_2$, respectively. This process continues in a similar fashion, until during time slot $TS_N$, error signal $E_N$ from the "$N^{th}$" DFE component $24_N$ is applied to common adaptive algorithm block 40 and used to generate updated tap weights $\epsilon_N(n)$ and $\kappa_N(n)$, respectively. Once the update has been completed for the Nth channel, the process cycles back to channel "1" and the process continues in similar fashion.

In this manner, therefore, each channel is given access to the common adaptive algorithm component in a controlled manner, allowing the dispersion equalizing components associated with each channel to be updated in a scheduled fashion. It is to be understood that in some embodiments of the present invention only an "FFE" dispersion compensation element (or only a "DFE" dispersion compensation element) will be employed. Other arrangements (in preferred embodiments) utilize both FFE and DFE elements to provide improved dispersion compensation.

Moreover, as illustrated in FIG. 4 and mentioned above, it is possible to configure the time slot assignments within a given frame such that channel(s) experiencing larger values of dispersion are given more frequent access to common adaptive algorithm component 40. In the frame scheduling of FIG. 4, for example, channel "1" is given access during every other time slot. This assignment may be "fixed", or modified as the transmission fibers change characteristics over time. Various other arrangements are possible, and preferably, the assignment can be re-configured as need be, by use of an external assignment control signal.

Although specific embodiments of the invention have been described in detail, it will be apparent to one skilled in the art that variations and modifications to the embodiments may be made while remaining in the spirit and scope of the present invention as defined by the claims hereinbelow.

What is claimed is:

1. An arrangement for providing electronic dispersion compensation (EDC) for a plurality of N optical receive channels, the arrangement comprising
    at least one equalizing component disposed along each optical channel of the plurality of N channels to provide dispersion compensation therealong;
    a common adaptive algorithm block for generating an updated set of tap weights for a channel i for adapting the applied dispersion compensation; and
    a time slot assignment module, coupled to both the common adaptive algorithm block and the plurality of N optical receive channels, for controlling the access of the plurality of N optical receive channels to the common adaptive algorithm block through assigning one or more specific time slots to each separate optical receive channel i of the plurality of N optical receive channels.

2. The arrangement as defined in claim 1 wherein the at least one equalizing component comprises a feedforward equalizing component (FFE) disposed along each channel of the plurality of N optical receive channels.

3. The arrangement as defined in claim 2 wherein the at least one equalizing component further comprises a decision-feedback equalizing component (DFE) disposed at the output of the associated FFE component along the optical receive channel.

4. The arrangement as defined in claim 1 wherein the at least one equalizing component comprises a decision-feedback equalizing component (DFE) disposed along each channel of the plurality of N optical receive channels.

5. The arrangement as defined in claim 1 wherein the time slot assignment module utilizes a fixed assignment protocol.

6. The arrangement as defined in claim 5 wherein the fixed time slot assignment provides a single time slot for each separate channel of the plurality of N optical receive channels.

7. The arrangement as defined in claim 5 wherein the fixed time slot assignment provides a plurality of separate time slots for at least one channel experiencing significant dispersion.

8. The arrangement as defined in claim 1 wherein the time slot assignment module utilizes a dynamic assignment protocol, modifying the number of time slots assigned to each channel as a function of dispersion changes along each optical fiber of the plurality of N optical fiber receive channels.

* * * * *